United States Patent [19]
Ouimet et al.

[11] Patent Number: 6,078,893
[45] Date of Patent: Jun. 20, 2000

[54] METHOD FOR STABILIZED TUNING OF DEMAND MODELS

[75] Inventors: Kenneth J. Ouimet, Sacramento; Charu V. Chaubal, Fair Oaks, both of Calif.

[73] Assignee: KhiMetrics, Inc., Sacramento, Calif.

[21] Appl. No.: 09/083,647

[22] Filed: May 21, 1998

Related U.S. Application Data

[60] Provisional application No. 60/049,996, May 21, 1997.

[51] Int. Cl.$^7$ .................................................. G06F 17/60
[52] U.S. Cl. ..................................... 705/10; 705/1; 705/7
[58] Field of Search ................................ 705/1, 7, 10, 14; 235/381

[56] References Cited

U.S. PATENT DOCUMENTS

| | | | |
|---|---|---|---|
| 5,245,533 | 9/1993 | Marshall | 705/10 |
| 5,270,921 | 12/1993 | Hornick | 705/6 |
| 5,377,095 | 12/1994 | Maeda et al. | . |
| 5,401,946 | 3/1995 | Weinblatt | 235/381 |
| 5,687,322 | 11/1997 | Deaton et al. | 705/14 |
| 5,765,143 | 6/1998 | Sheldon et al. | 705/28 |
| 6,009,407 | 12/1999 | Garg | 705/10 |

OTHER PUBLICATIONS

BioComp Systems Inc announces enterprise modeling server, compatible with Microsoft Windows 95 ans NT, New Intelligent software creates accurate forecasting models to increase effectiveness of the busines, sales and manufacturing process. Business Wire p0, Aug. 1, 1996.

Using Marketi Models To Forecast Demand For Ethical Pharmaceuticals. By Michael Latta, The Journal Of Business Forecasting, Spring 1998, Aug. 1, 1996.

"Promoman", Promotion Management System, Nielsen Marketing Research, 1992.

"The Robustness Of Retail–Level Price Elasticity Estimates" By Ruth N. Bolton, Journal of Retailing, vol. 65, No. 2, Summer 1989.

"Competing On Price: The Role Of Retail Price Advertisements In Shaping Store–Price Image" By Cox et al., Journal of Retailing, vol. 66, No. 4, Winter 1990.

"Reassessing Brand Loyalty, Price Sensitivity, And Merchandising Effects On Consumer Branch Choice" By Allenby et al., Journal of Business & Economic Statistics, Jul. 1955, vol. 13, No. 3.

"Increased Consumer Sales Response Though use Of 99–Ending Prices" By Schindler et al., Journal of Retailing, vol. 72(2), pp. 187–199.

*Primary Examiner*—Tod R. Swann
*Assistant Examiner*—M. Irshadullah
*Attorney, Agent, or Firm*—Graham & James LLP

[57] ABSTRACT

A method for tuning a demand model in manner that is stable with respect to fluctuations in the sales history used for the tuning is provided. A market model is selected, which predicts how a subset of the parameters in the demand model depends upon information external to the sales history; this model may itself have a number of parameters. An effective figure-of-merit function is defined, consisting of a standard figure-of-merit function based upon the demand model and the sales history, plus a function that attains a minimum value when the parameters of the demand model are closest to the predictions of the market model. This effective figure-of-merit function is minimized with respect to the demand model and market model parameters. The resulting demand model parameters conform to the portions of the sales history data that show a strong trend, and conform to the external market information when the corresponding portions of the sales history data show noise.

18 Claims, 16 Drawing Sheets

Select Models

Select Demand Model

1. Select Predefined Demand Model

2. Define New Demand Model $$> q_i = q_i^o \exp(-g_i (p_i / p_i^o))$$

Select Market Model

3. Select Predefined Market Model

4. Define New Market Model $$> M = \Sigma_i (g_i - \gamma_1(1-\gamma_2 e^{-\gamma_3 m_i}))^2$$

Select Figure-of-Merit Function

5. Select Predefined Figure-of-Merit Function

6. Define New Figure-of-Merit Function $$> \chi^2 = \Sigma_i (q_i - q^h_i) / \sigma_i$$

Q. Return to Main Menu

Figure 5

| Item | $q_0$ | g |
|---|---|---|
| 1 | 12504 | 0.285 |
| 2 | 9238 | 0.485 |
| 3 | 11029 | 1.384 |
| 4 | 15003 | 1.938 |
| 5 | 10290 | 0.976 |
| 6 | 11823 | 1.193 |

Figure 7

Select Models

Select Demand Model

1. Select Predefined Demand Model

2. Define New Demand Model $$> q_i = q_i^° \exp(-g_i\,(p_i/p_i^0))$$

Select Market Model

3. Select Predefined Market Model

4. Define New Market Model $$> g_i = \gamma_1(1 - \gamma_2 e^{-\gamma_3 m_i})$$

Q. Return to Main Menu

Figure 11B

METHOD FOR STABILIZED TUNING OF DEMAND MODELS

CROSS-REFERENCE TO RELATED APPLICATION

This application claims the benefit of U.S. Provisional Application No. 60/049,996, filed May 21, 1997, which application is specifically incorporated herein, in its entirety, by reference.

BACKGROUND OF THE INVENTION

1. Field of the Invention

The present invention relates to model-based pricing systems, and more particularly, to a computer-implemented method for tuning a consumer demand model that produces stable results with respect to random fluctuations of sales data.

2. Description of Related Art

Present pricing methods, while taking into account a tremendous amount of information (such as data collected from point-of-sale systems), ultimately depend upon a pricing analyst's expert intuition for setting prices. This reliance on a human entails a slow and qualitative pricing process. Even if this intuitive process could be captured by an expert system, it would still lack the quantitative description necessary to actually optimize prices. Retailers are being faced with an increasingly competitive and sophisticated environment, leading to lower margins and a stronger focus on retail pricing. Thus, the need for a more rigorous approach to pricing is becoming more urgent.

As known in the art, model-based approaches (e.g., consumer demand modeling) provide a more quantitative approach to pricing than the simple rules-based approaches, such as those embodied in expert systems. However, retailers have found these model-based approaches to be undesirable because they often produce results that are inaccurate and counter-intuitive. For example, one major obstacle to properly modeling consumer demand is that retail sales display a relatively strong stochastic component. Generally, if the price of an item is increased significantly, its sales will drop. However, when an increase in price is relatively small, the corresponding change in sales becomes unpredictable, and may even increase. These kinds of fluctuations tend to wildly mislead a consumer demand model, and may even lead to the conclusion that, as the price is increased, sales will also increase. This is an important problem, considering that only ten to twenty percent of a retailer's price changes are large enough to go beyond the noise present in the sales history and actually probe the demand structure.

Thus, a critical need exists for an efficient approach to pricing that yields accurate results.

SUMMARY OF THE INVENTION

The present invention provides a method for tuning a consumer demand model that is stable with respect to random fluctuations in sales data, thereby providing a model-based approach to pricing that is both efficient and accurate. It does so by making use of a market model to include external market information that is not included in the sales history. The present invention provides a way to use the collective information of the market as a whole to correct for noise in the sales data that could lead to unrealistic parameter values in the consumer demand model.

First, the user selects a demand model and a market model. The market model describes how some of the parameters of the demand model behave according to external market information. In a preferred embodiment, the market model is derived by studying prior sets of sales histories and determining an empirical relationship between the sales histories and the parameters of the demand model. In general, the market model will have a limited set of market model parameters, although the market model need not have parameters, and will depend on variables that are external to the sales history being used to tune the demand model.

By using the market model, external market information can be introduced to stabilize the tuning of the demand model in two ways. The first way is to introduce market information that is external to the sales history, thus providing a way to correct for errors in the sales history. Secondly, at the expense of a few additional tunable parameters, the market model includes a larger number of data points (the market information), which provides greater numerical stability in the actual tuning process.

In addition to selecting the demand and market models, the user selects a figure-of-merit function to use in fitting the model parameters to the sales data. In general, this figure-of-merit function attains a minimum value when the parameters of the models are adjusted to match as closely as possible to the sales data. Unlike prior art tuning methods, in which the figure-of-merit function depends only upon the demand function and the data used in the fitting, the present invention incorporates the market model into the figure-of-merit function. This is accomplished by defining an effective figure-of-merit function in such a way that a choice of parameters that behaves more consistently with the market model results in a lower value of the effective figure-of-merit function. If the sales data do not contain a great deal of noise, then the fit of the demand model to the sales history has a greater influence on the effective figure-of-merit function, and hence the parameters of the demand model. On the other hand, if the sales data do contain a lot of noise, then the market model has a greater influence on the parameters. The result is a demand model that is tuned robustly to both the sales history as well as the behavior of the external market.

In a second preferred embodiment, the user selects a demand model and a market model, and the demand model is tuned in three-steps. First, the demand model is fit to a given sales history, thus providing fitted values for the demand model parameters. The chi-squared fitting technique is utilized to fit the demand model to the sales history; however, other prior art fitting techniques could also be utilized. In the second step, the relevant parameters of the demand model are replaced with related parameters from the market model. This modified demand model is then refit to the same sales history, yielding fitted values for the market model parameters. The market model is then used to calculate the demand model parameters. In the third step, the results from the first two steps are combined in such a way to yield the most accurate final parameter values. If the sales data does not contain a great deal of noise, then the results from the first step are weighted more heavily. On the other hand, if the sales data does contain a lot of noise, then the results from the second step, which contain external market information, is weighted more heavily.

BRIEF DESCRIPTION OF THE DRAWINGS

FIG. 5 is a picture of an example of user input displayed on the display device for the Model Selection routine of the first preferred embodiment;

FIG. 7 is an example of a Parameter Tuning Table;

FIG. 11B is a picture of an example of user input displayed on the display device for the Model Selection routine of the second preferred embodiment;

DETAILED DESCRIPTION OF THE PREFERRED EMBODIMENT

The following description is present to enable one of ordinary skill in the art to make and use the invention and is provided in the context of a patent application and its requirements. Various modifications to the illustrated embodiments will be readily apparent to those skilled in the art and the generic principles herein may be applied to other embodiments. Thus, the present invention is not intended to be limited to the embodiment shown but is to be accorded the widest scope consistent with the principles and features described herein.

A First Preferred Embodiment

In a first preferred embodiment of the present invention, a computer-implemented retail model-based pricing method is provided that is stable with respect to random fluctuations in sales data. A retailer utilizes collected point-of-sale data (hereinafter "sales data") to predict the consumer demand of its retail products. The retailer selects an appropriate consumer demand model, which is tuned to the sales data while making use of a market model to include external market information that is not included in the sales data. As will be discussed below, the first preferred embodiment minimizes the influence of noise in the sales data that typically leads to unrealistic parameter values in prior art consumer demand models.

Figure 1:
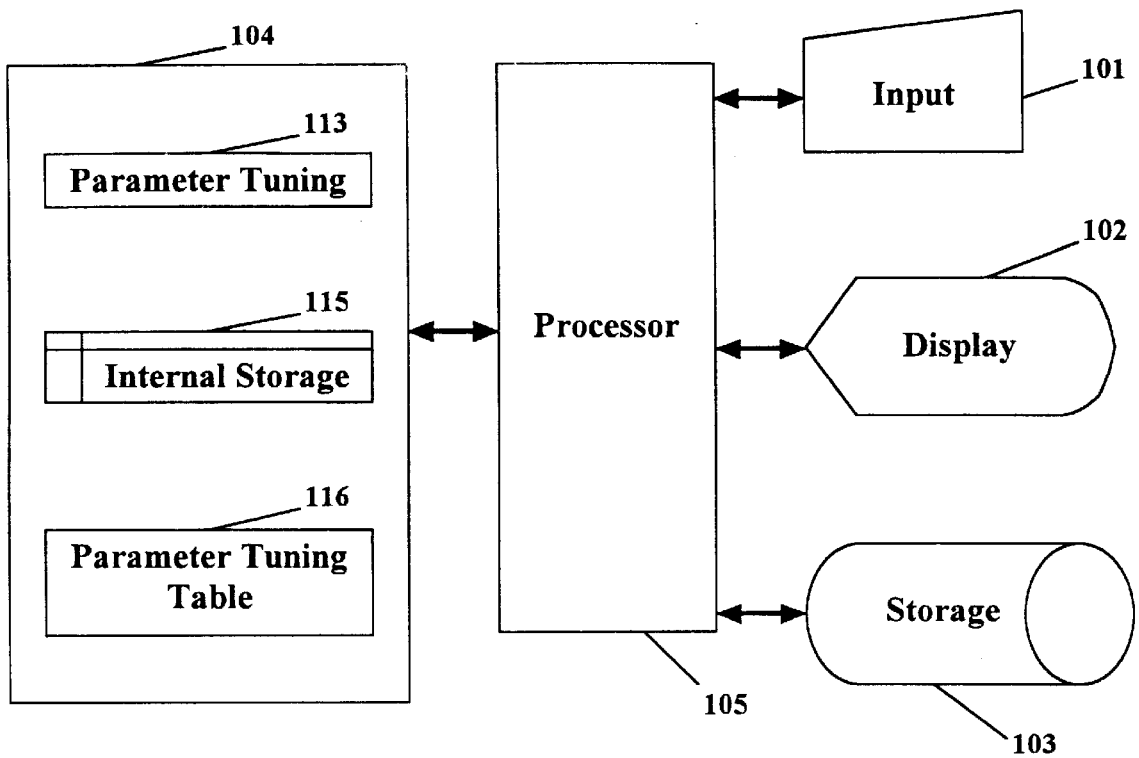
FIG. 1 is a high-level block diagram of a general-purpose computer system used in accordance with a first embodiment of the present invention.

As shown in FIG. 1, a system from the first preferred embodiment includes: an input device 101 such as a keyboard, through which a user enters commands, inputs functions, etc.; a display device 102 for displaying tables, etc.; a storage device 103 such as hard disk drive for storing results and sales date; a memory 104 for storing program instructions, tables and results; and a processor 105 for performing various kinds of processing and controlling the overall operation of the system.

The memory 104 includes at least the following: a Parameter Tuning Portion 113 for performing the tuning; an internal storage portion 115 for storing data necessary for the various calculations; and a Table portion 116 for storing tables and results.

It will be understood that the described embodiments of the present invention are embodied as computer instructions stored in memory 104 and executed by processor 105. These instructions can also be stored on a computer readable medium, such as a floppy disk, CD ROM, etc., and can also be transmitted in a network such as the internet, an intranet, etc., via a carrier wave embodying the instructions.

Operation of the System

Figure 3:
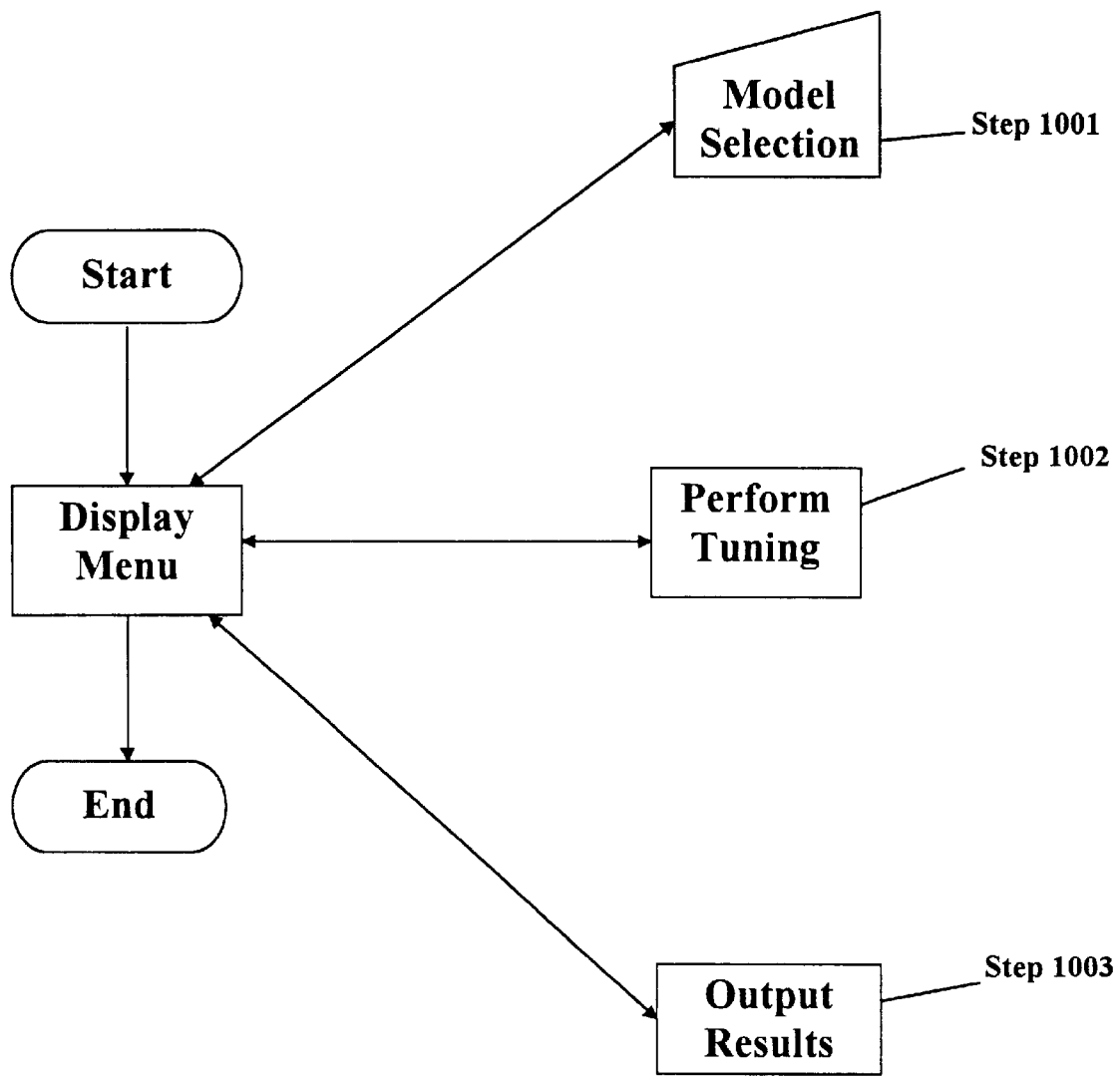
FIG. 3 is a flowchart describing the overall operation of the system in the first preferred embodiment.
Figure 4:
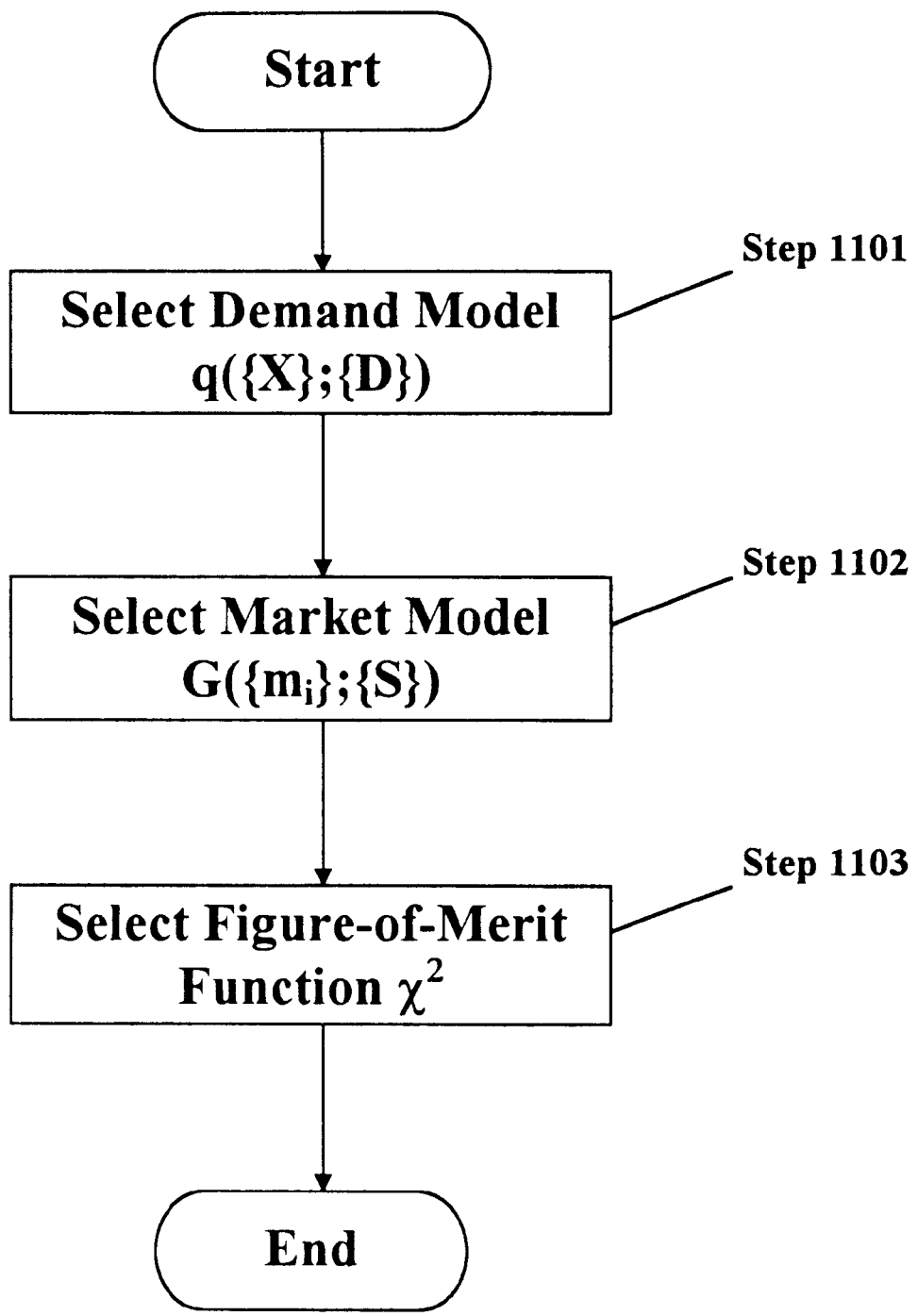
FIG. 4 is a flowchart of the Model Selection routine of the first preferred embodiment.
Figure 6:
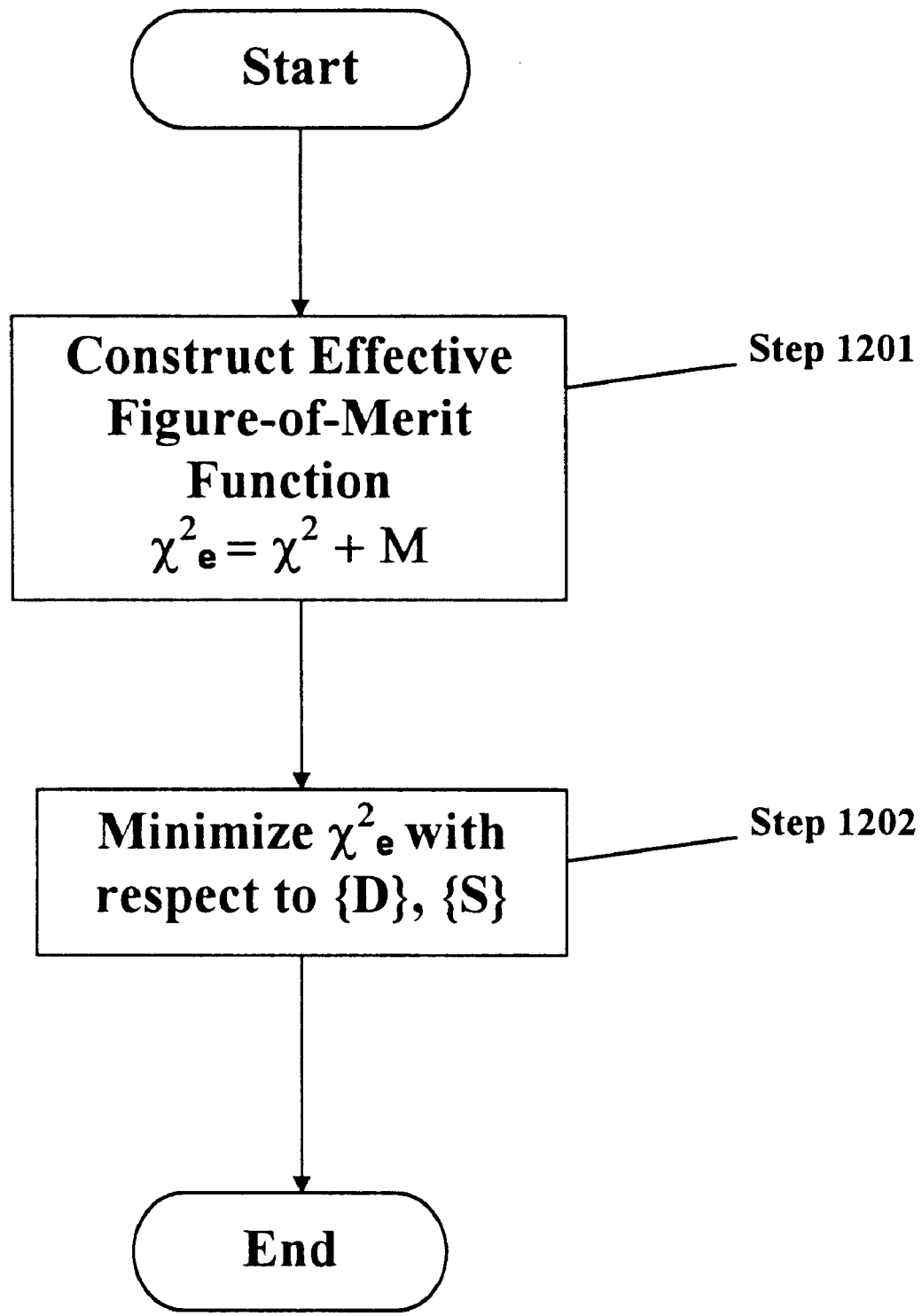
FIG. 6 is a flowchart of the Perform Tuning routine of the first preferred embodiment.

The operation of the first preferred embodiment of the present invention will be described in brief with reference to FIGS. 2 and 3 before being described in detail with reference to FIGS. 4 to 6.

Figure 2:
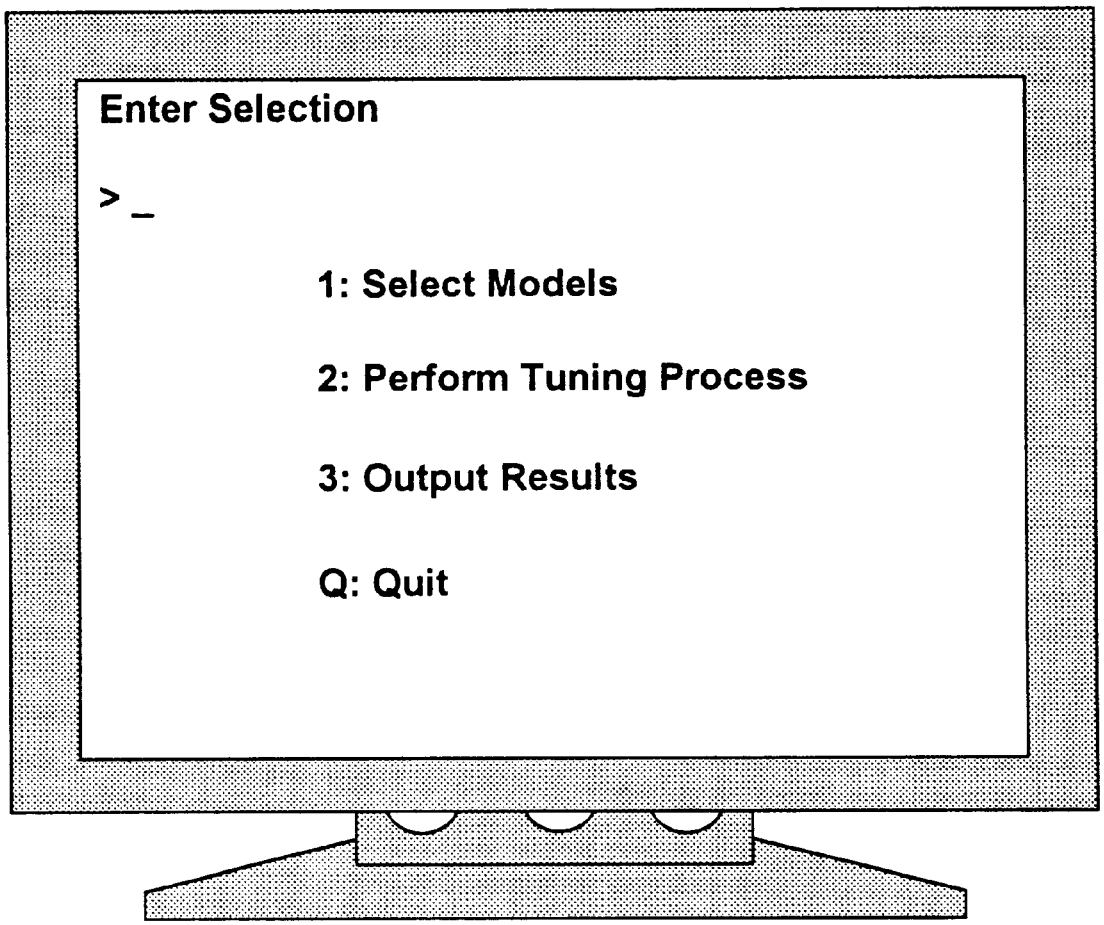
FIG. 2 is a picture of an example of the input menu displayed on the display device in the first preferred embodiment.

A retailer seeking to optimize pricing decisions in accordance with past sales data is shown a menu on the display device 102 as illustrated in FIG. 2. At this time the user enters one of the following selections through the input device 101: '1' to select the consumer demand and market models and figure-of-merit function, '2' to perform the entire tuning process of the demand model to the sales data, '3' to output results to the storage device 103, and 'Q' to terminate use of the system. Other appropriate methods and formats of input can, of course, be used.

The processor 105 receives the entered information, and the situation of the system is passed to one of the appropriate steps described below, according to the inputted value. This is represented schematically in FIG. 3.

(Step 1001): Model Selection

At this step, the user first selects a consumer demand model to be tuned to the sales data. Consumer demand models are known in the art, and in a preferred embodiment, the user will be provided with a database of predefined demand models from which to choose. It is also contemplated, as illustrated in FIG. 5, that the user will be given the option of defining a new demand model that can be tailored to meet the user's specific needs. The demand model illustrated in FIG. 5 is a simple one-dimensional model that determines the demand for an item i based solely upon operational variables affecting item i. However, it should be appreciated that the present invention can be utilized with any other demand model provided it conforms to the general form described below.

Next, the user selects a market model, which describes how some parameters of the demand model are expected to behave according to external market information. As illustrated in FIG. 5, the user entered a market model to describe the behavior of the variable $g_i$ from the selected demand model; however, it should be appreciated that other market models could be utilized to describe the behavior of variable $g_i$, or other variables that may be present in the selected demand model. In addition, the user can also be provided with a database of predefined market models, each corresponding to a particular demand model, from which to choose.

Finally, the user selects a figure-of-merit function, which is a function that attains a minimum value when the parameters of a model are adjusted to match as closely as possible to known data. As illustrated in FIG. 5, the user entered a figure-of-merit function that depends upon the selected demand model, and is equivalent to a standard $\chi^2$ function. In particular, $q_i^h$ represents the sales history for a particular item i, and $\sigma_i$ is the measurement error of the data. However, it should be appreciated that other figure-of-merit functions may be employed. In addition, the user can also be provided with a database of predefined figure-of-merit functions from which to choose. The details of the Model Selection routine of the first preferred embodiment are discussed below in conjunction with FIGS. 4 and 5.

(Step 1002): Tuning Process

In this step, the stabilized tuning of the consumer demand model selected in Step 1001 is performed. An effective figure-of-merit function is constructed from the market model and the figure-of-merit function, as selected in Step 1001. The parameters that minimize the effective figure-of-merit function are then determined. The market function stabilizes the tuning process by incorporating information external to the sales history. It will be appreciated by those having ordinary skill in the art that the selected consumer demand model is tuned such that it will not be misled by random fluctuations in sales data, making the selected consumer demand model an accurate and efficient tool for optimizing retail pricing. The details of the Tuning Process of the first preferred embodiment are discussed below in conjunction with FIG. 6.

(Step 1003): Output Results

The final tuned demand model is stored in the storage device 103. This stored data can then be utilized by another routine, for example, a forecasting system of a price optimization system.

Model Selection

A preferred embodiment of this routine will be described with reference to FIGS. 4 and 5. The user is presented with a menu, such as illustrated in FIG. 5, to prompt the user through the Model Selection routine as illustrated in FIG. 4. It should be appreciated that other appropriate methods and formats of input can, of course, be used, and that the simplified menu of FIG. 5 is presented for illustrative purposes only.

(Step 1101)

The user first selects a consumer demand model to be used in the analysis. In a preferred embodiment, the user will be provided with a database of predefined demand models from which to choose. It is also contemplated, as illustrated in FIG. 5, that the user will be given the option of defining a new demand model, tailored to meet the user's specific needs. Although any demand model may be used in the first preferred embodiment of the present invention, it is assumed that it conform to the general form $$q=q(\{X\};\{D\}),$$

where $\{D\}$ are the demand parameters, and $\{X\}$ is the set of all variables for all items. Notice that in general, the sales of one item can depend upon the parameters of all the other items. The reason for this is that the demand for a single item can and usually does depend upon the demand for all other items. This can in general lead to a system of coupled equations that describe the demand for each item in a given group. The variables that affect the demand can include, but is not limited to, price, sales history, promotional activity, weather conditions, location, currency exchange rate, inflation rate, etc.

The following form gives one particular example of a relevant demand model:

$$q_i=q_i^0 \exp(-g_i p_i/p_i^0)$$

Here, the demand model is one-dimensional, in that the demand for item i depends only upon the variables affecting item i and not any other item. In addition, the variables $\{X\}$ are simply the prices $\{p\}$. In this case, the demand parameters are $q_i^0$, which scales the amount of sales, and $g_i$, which describes the sensitivity of the item to price. $p_i^0$ is a constant equal to the average price of the item.

It should be appreciated that more complicated demand models can be selected, for example, a demand model in which there is nonlinear cross-correlation between the variables of different items.

(Step 1102)

The user selects a market model, which describes how all or some subset $\{g\}$ of the parameters $\{D\}$ are expected to vary according to price information from other stores. In a preferred embodiment, the user will be provided with a database of predefined market models corresponding to the demand model selected at Step 1101, from which to choose. Further, as illustrated in FIG. 5, the user can have the option of defining a new market model.

The behavior of market model will be embodied in a function of the form $$M=M(\{g\};\{S\})$$

where $\{g\}$ is a subset of the demand parameters and $\{S\}$ are the market model parameters. This function is defined such that it attains a value of zero when the parameters $\{g\}$ are exactly equal to those described by the model. It essentially behaves as a penalty function whose value decreases as the parameters $\{g\}$ obey the market model behavior more closely.

The introduction of a market model lends stability to the tuning process. It takes advantage of information in the market, which is not captured by the demand model, to quantify the validity of the values of the demand parameters. The need for this ability can be understood by referring back to the example demand model from Step 1101. In a typical sales history, many items will have no price change at all. In this case, a conventional tuning method becomes very unstable and can yield almost any value for the sensitivity $g_i$.

One possible market model for the demand model given above is:

$$M(\{g\},\{S\})=\Sigma_i(g_i-g(m_i,\{S\}))^2,$$

$$g(m_i,\{S\})=s_1(1-s_2 \exp(-s_3 m_i)),$$

where m is the average margin, i.e., m=(average price)/(cost) for an item in the market of interest, and the $\{S\}$ are adjustable market model parameters $s_1$, $s_2$, and $s_3$. This function effectively adds a penalty for values of the parameter g that stray from those which are expected based on the average margin for an item. It should be appreciated that more complicated market models can be selected, even for the same demand model. It should further be appreciated that the market model need not contain adjustable market model parameters $\{S\}$.

(Step 1103)

The user selects a figure-of-merit function to be used to tune the demand model to the sales history. In a preferred embodiment, the user will be provided with a database of predefined figure-of-merit functions from which to choose. It is also contemplated, as illustrated in FIG. 5, that the user will be given the option of defining a new figure-of-merit function, tailored to meet the user's specific needs.

In general, this figure-of-merit function is a quantity that attains a minimum value when the parameters of the demand model are adjusted to match as closely as possible to known data. Such functions are well known in the art and numerically indicate how well a model represents a set of data. Tuning methods associated with particular figure-of-merit functions include the least-squares method, the chi-squared method, and the method of M-estimates. Example of tuning functions can be found in W. Press, et. al., *Numerical Recipes: The Art of Scientific Computing*, Cambridge University Press, New York (1992), which is herein incorporated by reference. An example of a figure-of-merit function based upon the chi-squared method of data fitting is given by the following expression:

$$\chi^2 = \Sigma_{i,j}(q_i(\{D\};\{X_j\}) - q_i^h(\{X_j\}))/s_{i,j}$$

where $q_i(\{D\};\{X_j\})$ is the demand prediction for item i at the conditions given by the specific values $X_j$, based upon the parameters $\{D\}$, and $q_i^h(\{X_j\})$ are the actual values for the demand (e.g., the actual sales) obtained from the sales history at the same conditions $\{X_j\}$. $S_{i,j}$, represents the measurement error for the data point for item i at $\{X_j\}$.

Tuning Process

The details of this routine will be described with reference to FIG. 6. As known in the art, a procedure for tuning a demand model would be to minimize the $\chi^2$ function with respect to the parameters $\{D\}$, with the result that the final values for $\{D\}$ provide the best fit of the demand model to the sales history. Those skilled in the art will appreciate that if the sales history data contains a lot of noise, then the minimization of this function would be a mathematically unstable process. This is because there would be no unique way to choose $\{D\}$ such that the value of $\chi^2$ attains a minimum, and so the minimization routine would jump unstably from choice to choice. As will be apparent from the discussion below, the method of the present invention stabilizes the tuning of the demand model, thus providing a solution to this problem.
(Step 1201)

In a preferred embodiment, an effective figure-of-merit function $\chi^2_e$ is constructed according to the general form:

$$\chi^2_e = \chi^2(\{D\}) + M(\{g\};\{S\})$$

Thus, $\chi^2_e$ depends upon both the demand model parameters $\{D\}$ as well as the market model parameters $\{S\}$. Note that the dependence on $\{g\}$ is implied, since it is a subset of $\{D\}$.
(Step 1202)

The function $\chi^2_e$ is minimized with respect to the parameters $\{D\}$ and $\{S\}$. This minimization can be performed by using any standard function minimization routine; a number of such methods are well known in the art. It should be appreciated that any technique used to minimize the original $\chi^2$ can also be utilized to perform the minimization of $\chi^2_e$.

The advantage of minimizing $\chi^2_e$ can be understood as follows. If the sales history shows a strong, well-defined trend, then $\chi^2$ and hence $\chi^2_e$ will have a much lower value when the demand parameters conform to this trend. On the other hand, if the data had a lot of noise, then there will be no unique way to choose the demand parameters to minimize the value of $\chi^2$, because any choice for the parameters would result in a high value for this quantity. However, if the demand parameters are chosen such that M attains a low value, this would cause the resulting $\chi^2_e$ to become lower. Therefore, the values of the demand parameters that minimize M will be favored. Thus, having this second term, M, in the minimization routine stabilizes the tuning, because it forces the minimization routine to settle upon specific values for the demand parameter, as opposed to jumping around from choice to choice, which would occur in the absence of the second term.

If the sales history and the market model are in conflict with each other for a certain demand parameter, then the ultimate value of this parameter will simply depend upon the degree to which the relevant portion of the sales history is free of noise. It will also depend upon the choice of the market model, for if the magnitude of M is small with respect to $\chi^2$, then parameter values which minimize M would not be weighted as heavily as parameter values that minimize $\chi^2$. Thus, the choice of the market model by the user should be considered in the light of this feature of the invention.

The fitted values of the demand model parameters $\{D\}$ are stored in a Parameter Tuning Table of the Table portion 116 of the memory 104. An example of a Parameter Tuning Table is provided in FIG. 7. This table can then be stored in an external storage unit and used in another routine, for example, a forecasting system, or a price optimization system.

A SECOND PREFERRED EMBODIMENT

In a second preferred embodiment of the present invention a retailer selects an appropriate consumer demand model, which is tuned to the sales data while making use of a micro-market model to include external market information that is not included in the sales data. As known in the art, the micro-marketing approach involves breaking up a retailer's market into smaller, well-defined groups, allowing the retailer to maximize its profits and market share by determining its optimum position in each niche market. As will be discussed below, the second preferred embodiment corrects for noise in the sales data that typically leads to unrealistic parameter values in prior art consumer demand models.

Figure 8:
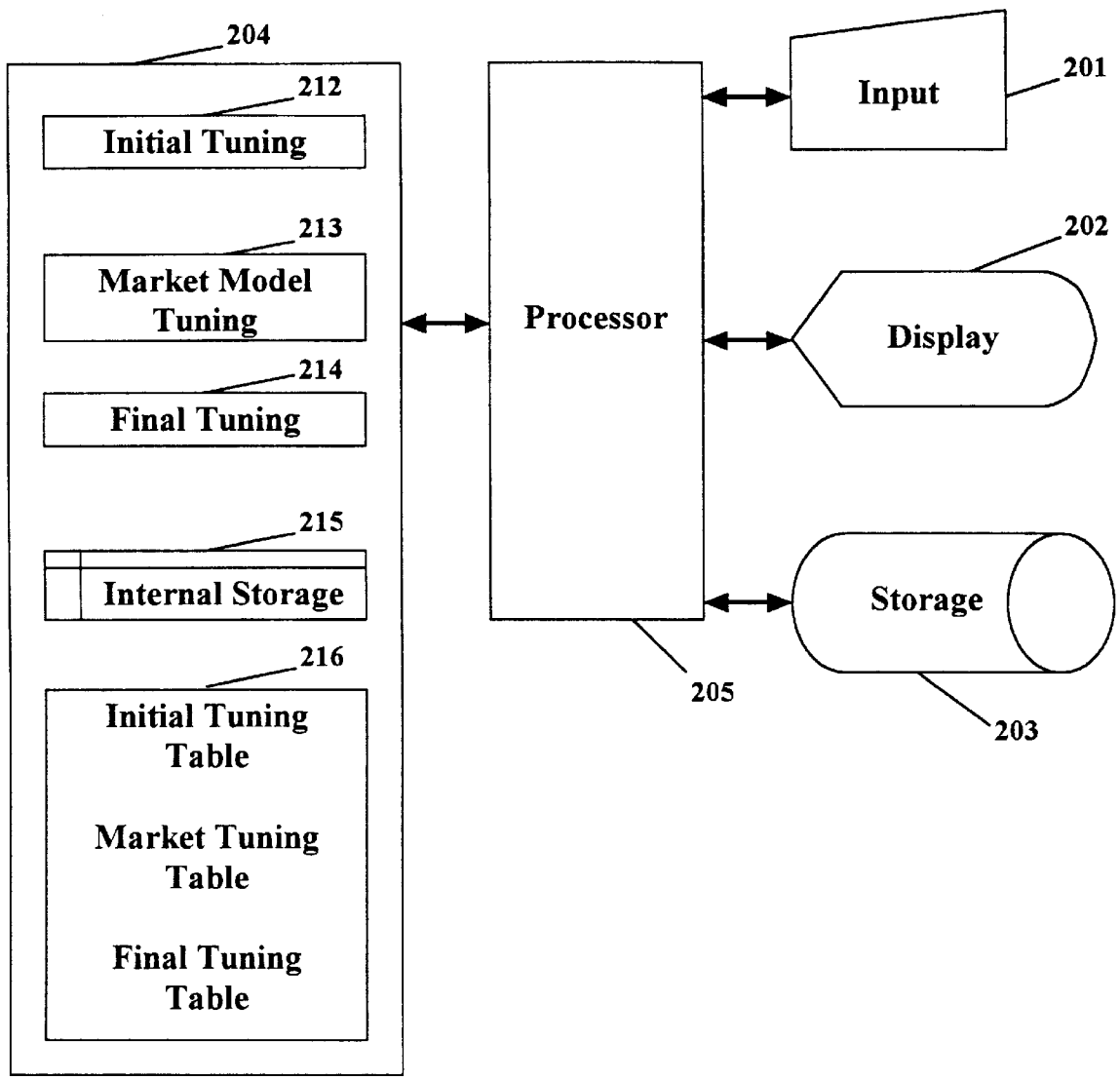
FIG. 8 is a high-level block diagram of a general-purpose computer system used in accordance with a second preferred embodiment of the present invention.

As shown in FIG. 8, a system from the second preferred embodiment includes: an input device 201 such as a keyboard, through which a user enters commands, inputs functions, etc.; a display device 202 for displaying tables, etc.; a storage device 203 such as hard disk drive for storing results and sales date; a memory 204 for storing program instructions, tables and results; and a processor 205 for performing various kinds of processing and controlling the overall operation of the system.

The memory 204 includes at least the following: an Initial Tuning portion 212 for performing the initial tuning of the demand model; a Market Tuning Portion 213 for performing the market-based tuning; a Final Tuning portion 214 for generating the final demand model; an internal storage portion 215 for storing data necessary for the various calculations; and a Table portion 216 for storing tables and results.

Operation of the System

The operation of the second preferred embodiment of the present invention will be described in brief with reference to FIGS. 9 and 10 before being described in detail with reference to FIGS. 11–15.

Figure 9:
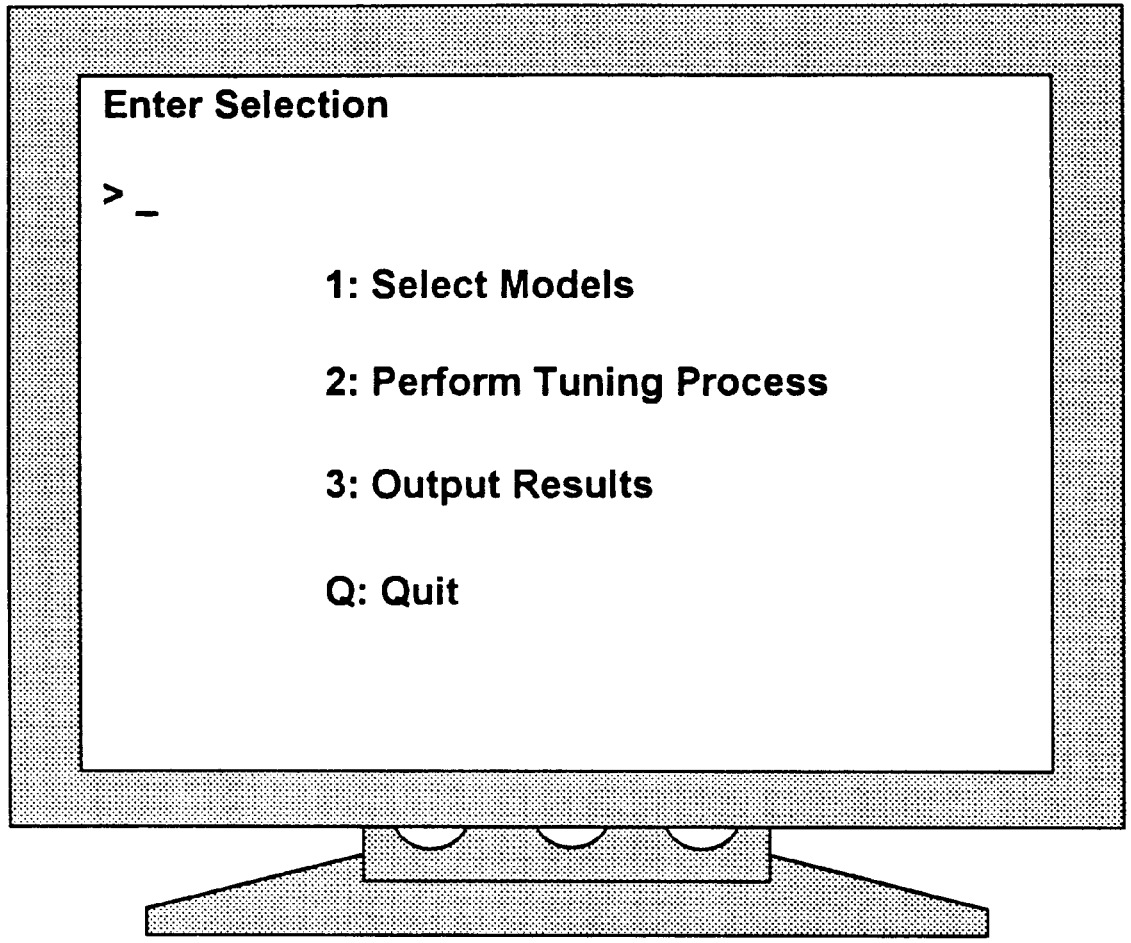
FIG. 9 is a picture of an example of the input menu displayed on the display device in the second preferred embodiment of the present invention.
Figure 10:
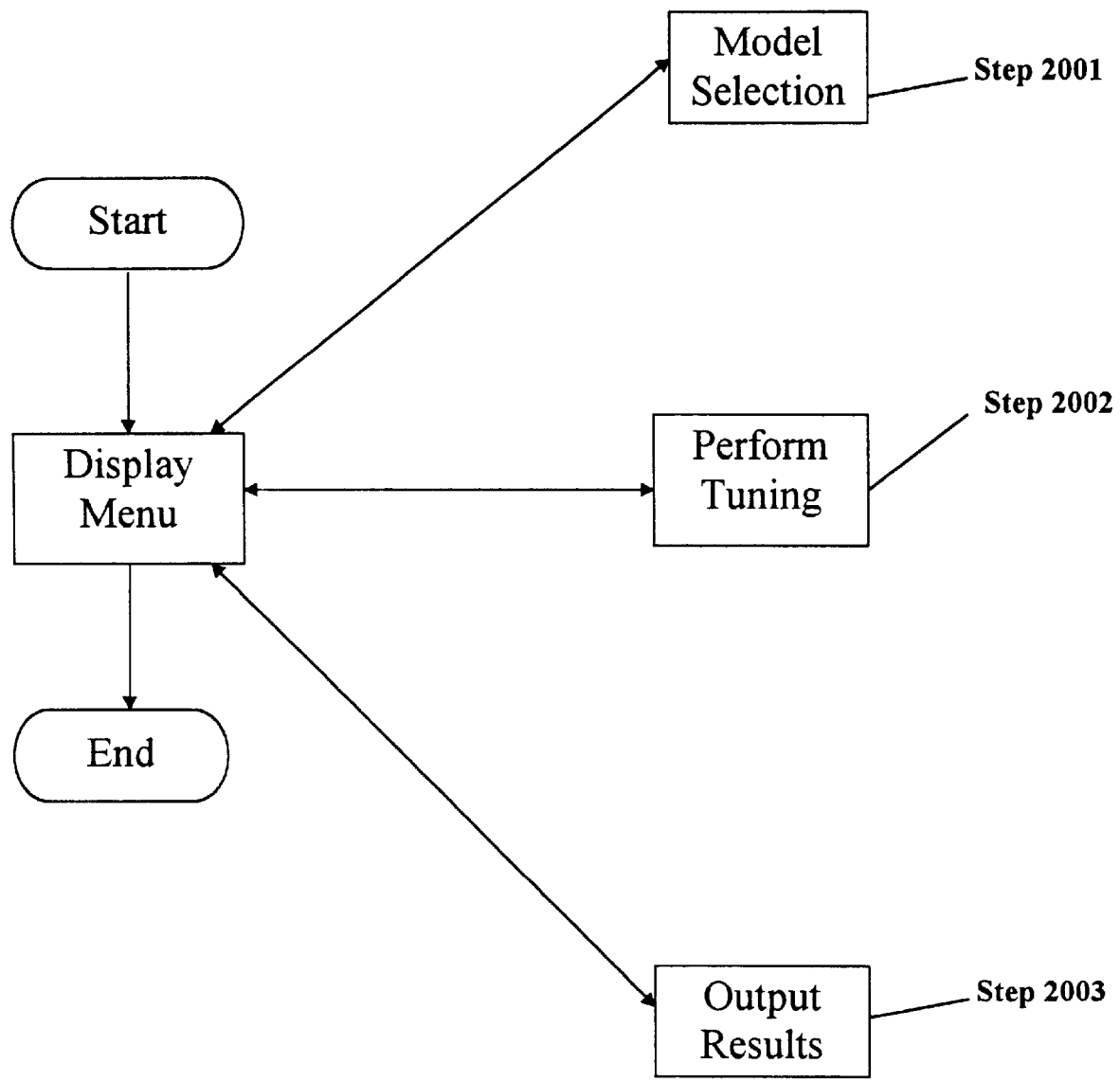
FIG. 10 is a flowchart describing the overall operation of the second preferred embodiment.

A retailer seeking to optimize pricing decisions in accordance with past sales data is shown a menu on the display device 202 as illustrated in FIG. 9. At this time the user enters one of the following selections through the input device 201: '1' to select the consumer demand and market models, '2' to perform the entire tuning process of the demand model to the sales data, '3' to output results to the storage device 203, and 'Q' to terminate use of the system. Other appropriate methods and formats of input can, of course, be used.

The processor 205 receives the entered information, and the situation of the system is passed to one of the appropriate steps described below, according to the inputted value. This is represented schematically in FIG. 10.

(Step 2001): Model Selection

At this step, the user first selects a consumer demand model to be tuned to the sales data. Consumer demand models are known in the art, and in a preferred embodiment, the user will be provided with a database of predefined demand models from which to choose. It is also contemplated, as illustrated in FIG. 11B, that the user will be given the option of defining a new demand model that can be tailored to meet the user's specific needs. The demand model illustrated in FIG. 11B is a one-dimensional model that determines the demand for an item i based solely upon operational variables affecting item i. However, it should be appreciated that the second preferred embodiment can be utilized with any other demand model provided it conforms to the general form described below.

Figure 11A:
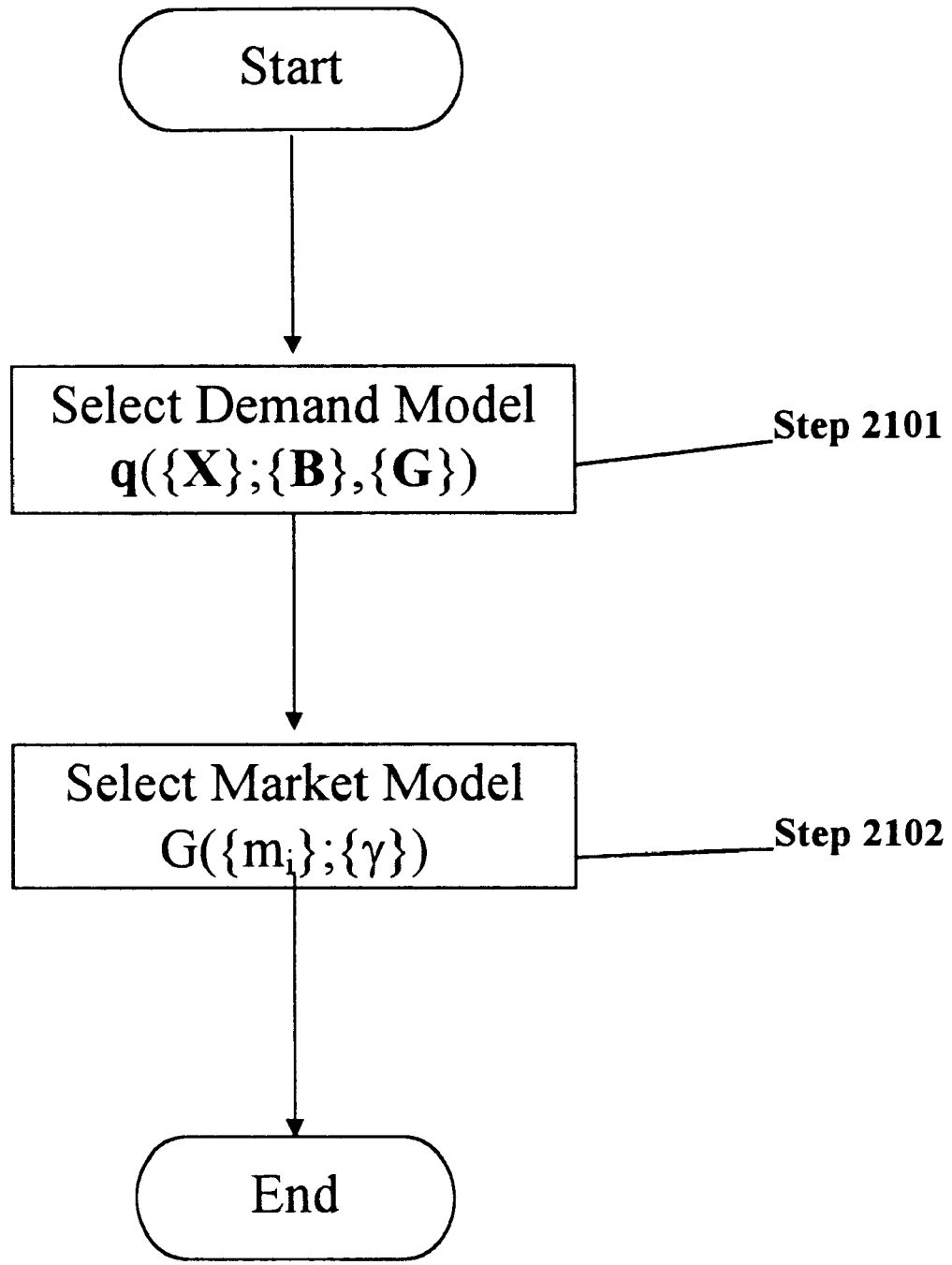
FIG. 11A is a flowchart of the Model Selection routine of the second preferred embodiment.

Next, the user selects a market model, which predicts how some parameters of the selected demand model behave according to external market information. As illustrated in FIG. 11B, the user entered a market model to describe the behavior of the variable $g_i$ from the selected demand model; however, it should be appreciated that other market models could be utilized to describe the behavior of variable $g_i$, or other variables that may be present in the selected demand model. The user will also be provided with a database of predefined market models, each corresponding to a particular demand model, from which to choose. The details of the Model Selection routine of the second preferred embodiment are discussed below in conjunction with FIGS. 11A and 11B.

(Step 2002): Tuning Process

In this step, the stabilized tuning of the consumer demand model selected in Step 2001 is performed. First, the demand model is fit to a given sales history, thus providing fitted values for the demand model parameters. Second, certain parameters of the demand model are replaced with related parameters from the market model. This modified demand model is then refit to the same sales history, yielding fitted values for the market model parameters, and the market model is then used to determine the demand model parameters. As will be discussed in detail below, the results from the first two steps are then combined to yield accurate final parameter values. The results of the second step, which contain external market information, are weighted more heavily when the sales data contains a large amount of noise, and less heavily when the sales data does not contain a large amount of noise. It will be appreciated by those having ordinary skill in the art that the selected consumer demand model is tuned such that it will not be misled by random fluctuations in sales data, making the selected consumer demand model a useful and efficient tool for optimizing retail pricing. The details of the Tuning Process routine of the second preferred embodiment are discussed below in conjunction with FIG. 12.

(Step 2003): Output Results

The final demand model, tuned and optimized to yield accurate final parameters, is stored in the storage device 203.

This stored data can then be utilized by another routine, for example, a forecasting system of a price optimization system.

Model Selection

A preferred embodiment of this routine will be described with reference to FIGS. 11A and 11B. The user is presented with a menu, such as illustrated in FIG. 11B, to prompt the user through the Model Selection routine as illustrated in FIG. 11A. It should be appreciated that other appropriate methods and formats of input can, of course, be used, and that the simplified menu of FIG. 11B is presented for illustrative purposes only.

(Step 2101)

The user first selects a consumer demand model to be used in the analysis. In a preferred embodiment, the user will be provided with a database of predefined demand models from which to choose. It is also contemplated, as illustrated in FIG. 11B, that the user will be given the option of defining a new demand model, tailored to meet the user's specific needs. Although any demand model may be used in the second preferred embodiment of present invention, it is assumed that it conform to the general form $$q=q(\{X\};\{G\},\{B\}),$$

where $\{B\}$ are the base parameters and $\{G\}$ are the universal parameters, and $\{X\}$ is the set of all operational variables for all items. The assumption is that the base parameters, depend upon item-specific quantities, while the universal parameters depend upon behavior common to all items in the marketplace. Notice that in general, the sales of one item can depend upon the parameters of all the other items. The reason for this is that the demand for a single item can and usually does depend upon the demand for all other items. This can in general lead to a system of coupled equations that describe the demand for each item in a given group.

(Step 2102)

The user selects a market model, which describes how the universal parameters $\{G\}$ vary according to price information from other stores. In a preferred embodiment, the user will be provided with a database of predefined market models, corresponding to the demand model selected at Step 2101, from which to choose. Further, as illustrated in FIG. 4B, the user will have the option of defining a new market model. The market model will in general have a limited set of parameters $\{\gamma_1, \gamma_2, \ldots\}$, and be of the form $$G_i = G(\{m_i\};\{\gamma\})$$

where $\{m_i\}$ are one or more market variables for item i and $\{\gamma\}$ is a set of market model parameters.

The following form gives one particular example of a relevant demand model:

$$q_i = q_i^0 \exp\left(-g_i \frac{p_i}{p_i^0}\right)$$

Here, the demand model is one-dimensional, in that the demand for item i depends only upon the operational variables affecting item i and not any other item. In addition, the operational variables $\{X\}$ are simply the prices $\{p\}$. In this case, the base parameters $B_i$ for one item are simply $q_i^0$ and $p_i^0$, which scale the amount of sales and price, respectively. Their values would depend on simply what are the typical sales level and price of the item. On the other hand, $g_i$ provides the sensitivity of the item to price; a large value would mean that sales drop off very rapidly even if price is increased only slightly. Items which have the same sensitivity to price would have the same $g_i$, but with different $q_i^0$ and $p_i^0$.

The sensitivity of each item is a quantity that one should be able to determine by studying other market indicators. For example, it is empirically known that when an item's markup is very low, this indicates that its sensitivity is large. By studying prior sales histories, in particular, those that provide an observable trend of demand as a function of price, one can estimate how g correlates with average markup in a particular market. An example of a market model that can be derived from the above demand model is $$g_i = \gamma_1(1 - \gamma_2 e^{-\gamma_3 m_i})$$

Here, the γ's are the market model parameters, and m is the average markup of an item in the market, i.e., m=(average price)/(cost); m for an item can be easily obtained from looking at competitors' prices and using one's own cost in the formula. Thus, this market model provides a way to determine the universal parameters $\{G_i\}$ from known market information. Significantly, all of the parameters $\{G\}$ have been replaced by only three, $\gamma_1$, $\gamma_2$, and $\gamma_3$.

The above example illustrates how the derivation of a market model for the second preferred embodiment may be performed. It should be appreciated that more complicated demand models can be selected, for example, a demand model in which there is cross-correlation between the operational variables of different items. An appropriate market model can be derived by modeling the behavior of the universal parameters.

Tuning Process

Figure 12:
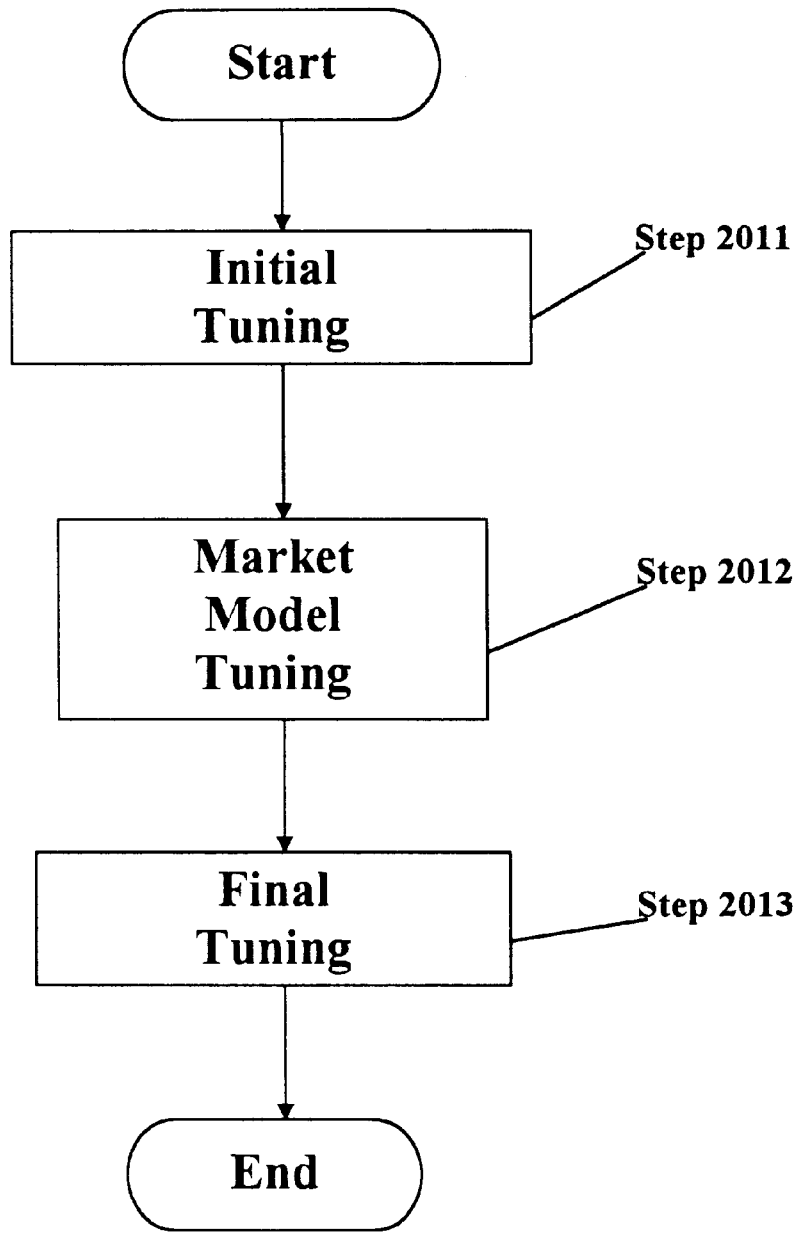
FIG. 12 is a flowchart of the Perform Tuning routine of the second preferred embodiment.

The details of the Tuning Process of the second preferred embodiment will be described with reference to FIG. 12.
(Step 2011): Initial Tuning First, the selected consumer demand model is fit to a sales history. All the $\{B\}$ and $\{G\}$ in the demand model are fitted to the sales history, and the results for $\{G\}$ are stored as $\{G\}_{init}$, along with the statistics of the fit. The details of a preferred embodiment the Initial Tuning routine are discussed below in conjunction with FIG. 13.
(Step 2012): Market Model Tuning In this step, every universal parameter $\{G_i\}$ in the demand model is replaced with the appropriate market model expression, as selected in the Model Selection routine of the second preferred embodiment. A second set of base parameters $\{B\}$ as well as the market model parameters $\{\gamma_1, \gamma_2, \ldots\}$ are then fitted to the demand model using the same sales history. A set of modified universal parameters $\{G\}_{mod}$ is determined from the market model, using the fitted market model parameters $\{\gamma_1, \gamma_2, \ldots\}$, and the results are stored, along with the statistics of the fit. The details of the Market Model Tuning routine of the second preferred embodiment are discussed below in conjunction with FIG. 13.

It should be appreciated by those having ordinary skill in the art, that by using the market model, external market information is introduced to reduce the number of tunable parameters in the demand model. This stabilizes the tuning of the demand model in two ways: 1) it introduces market information which is external to the sales history, thus providing a way to correct for errors in the sales history; and 2) it reduces the number of tunable parameters, thus allowing for a way to minimize the influence of random noise in the data.

The second advantage stated above can be more clearly seen by an analogy with fitting points on a graph to an equation. If the equation is complicated and has many parameters, then any scatter in the data will be faithfully captured by the parameters, yielding an equation that predicts that particular set of points well but that would not work well in predicting a general situation. On the other hand, if the equation can only describe a line or a quadratic curve, then the parameters can only be chosen that best fit the curve. The resulting equation might not provide a precise fit to that set of points, but it would be much more robust and able to predict additional situations with greater accuracy. In addition, it becomes numerically more difficult to fit data to a functional form as the number of parameters in the function increase; this provides another source of error.
(Step 2013): Final Tuning A final value for all the universal parameters $\{G\}_{final}$ is obtained by combining $\{G\}_{init}$ and $\{G\}_{mod}$, in accordance with the amount of noise found in the sales history. The results of the Market Model Tuning, which contain external market information, are weighted more heavily when the sales history contains a large amount of noise, and less heavily when the sales history does not contain a large amount of noise. The final universal parameters $\{G\}_{final}$ are then used to refit the item-specific parameters $\{B\}$ to the known sales history, thus giving the final values for the item specific parameters $\{B\}$. Thus, the selected consumer demand model has been tuned in a manner that prevents it from being misled by random fluctuations in sales data, making the selected consumer demand model a useful and efficient tool for optimizing retail pricing. The details of the Final Tuning routine of the second preferred embodiment are described below in conjunction with FIG. 14.

Initial Tuning

Figure 13:
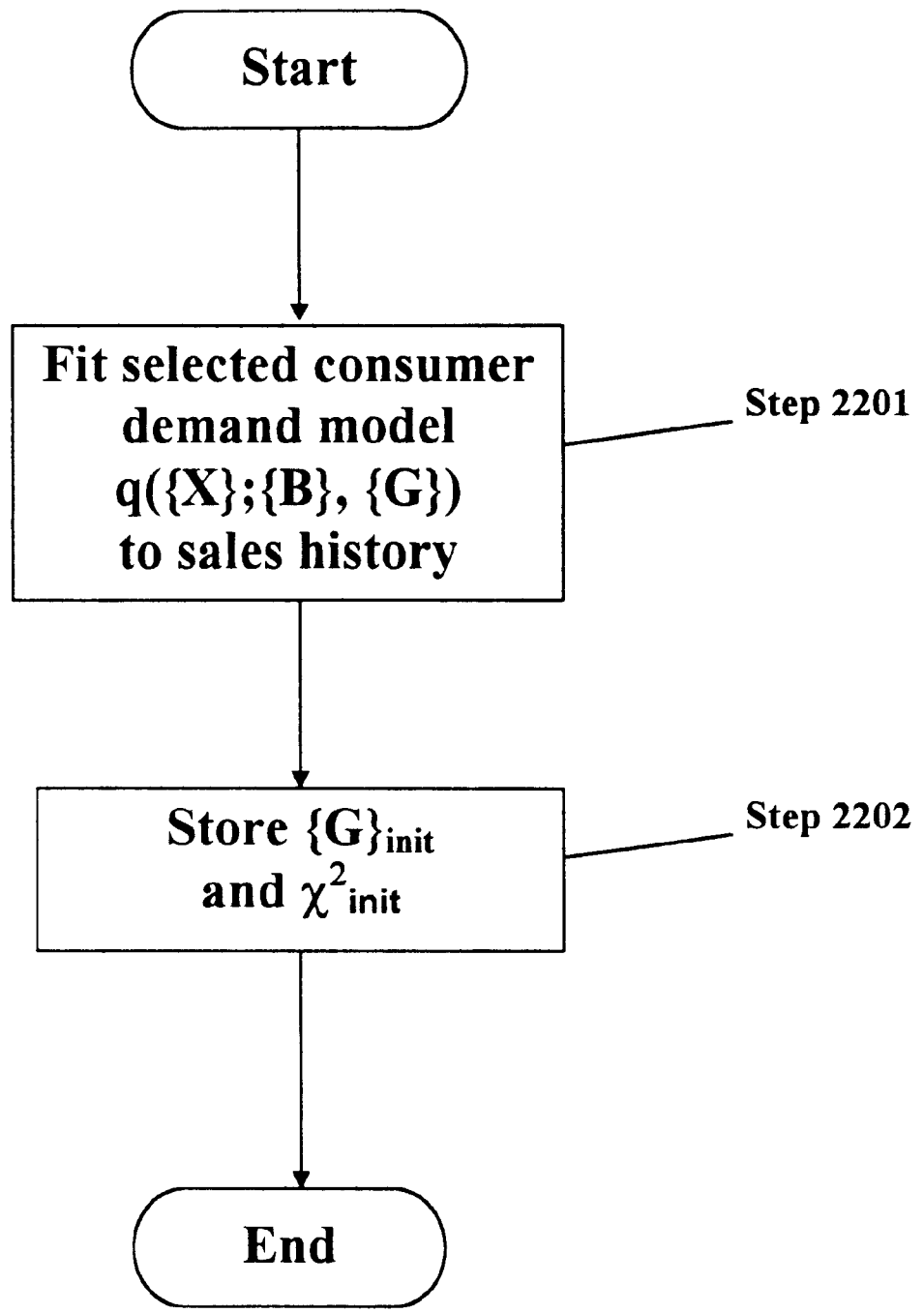
FIG. 13 is a flowchart of the Initial Tuning subroutine of the Perform Tuning routine of the second preferred embodiment.

A preferred embodiment of this routine will be described with reference to FIG. 13.
(Step 2201)

In a preferred embodiment, the selected consumer demand model, represented as function $q(\{X\};\{B\},\{G\})$ is fit to a given sales history, i.e., a set of data given demand q vs. operational variables $\{X\}$. This fitting involves determining the base parameters $\{B\}$ and universal parameters $\{G\}$ using a standard chi-squared fitting technique, thus yielding the set of parameters that best fit the data along with the chi-squared estimate of the accuracy of the fit. It should be appreciated that other prior art fitting techniques can also be utilized to perform the fitting operations of the present invention.
(Step 2202)

The fitted values of the universal parameters $\{G\}$, denoted as $\{G\}_{init}$, and the chi-squared estimate of the accuracy of the fit, denoted as $\chi^2_{init}$, are stored in an Initial Tuning Table of the Table portion 216 of the memory 204.

Market Model Tuning

Figure 14:
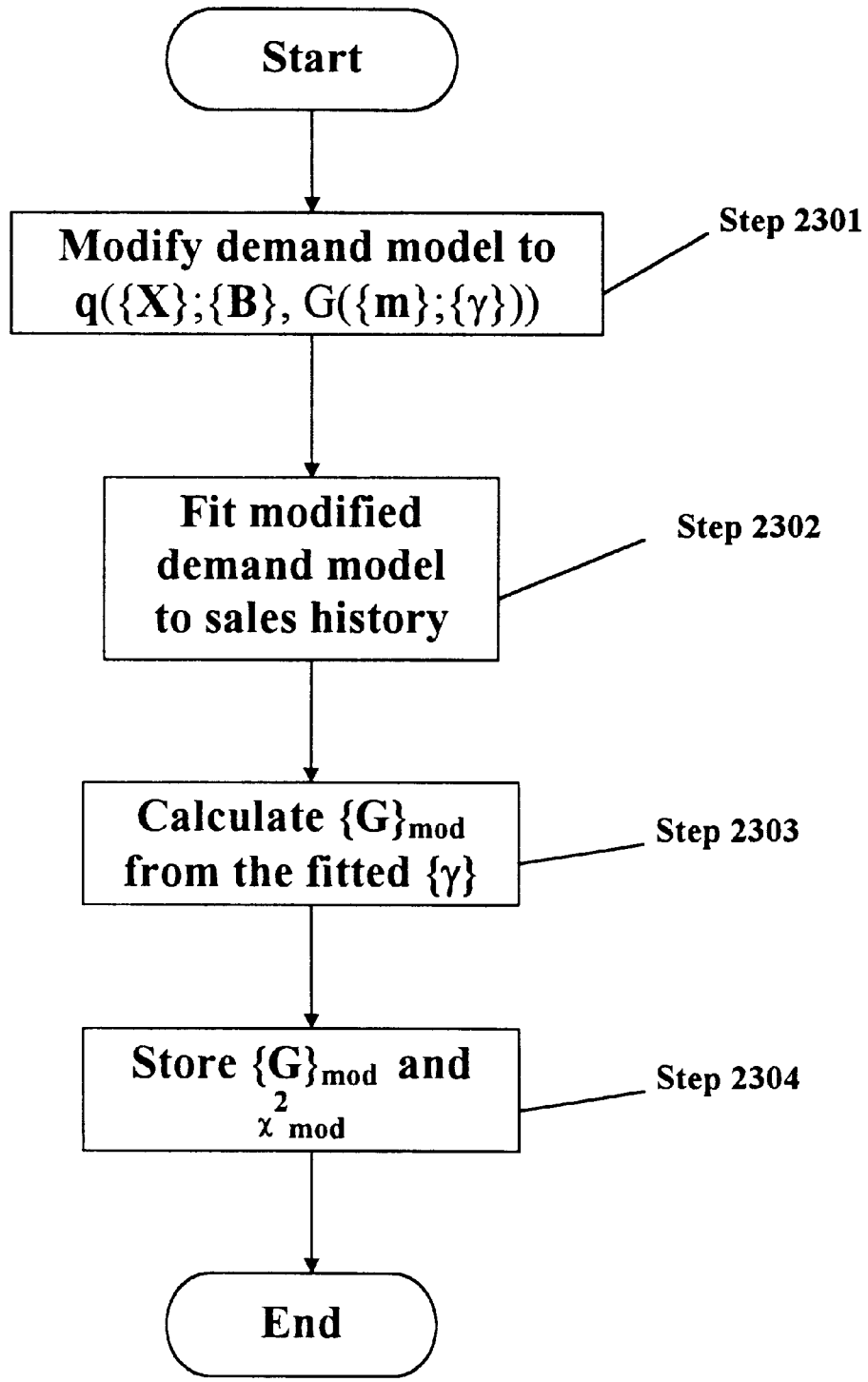
FIG. 14 is a flowchart of the Market Model Tuning subroutine of the Perform Tuning routine of the second preferred embodiment.
Figure 15:
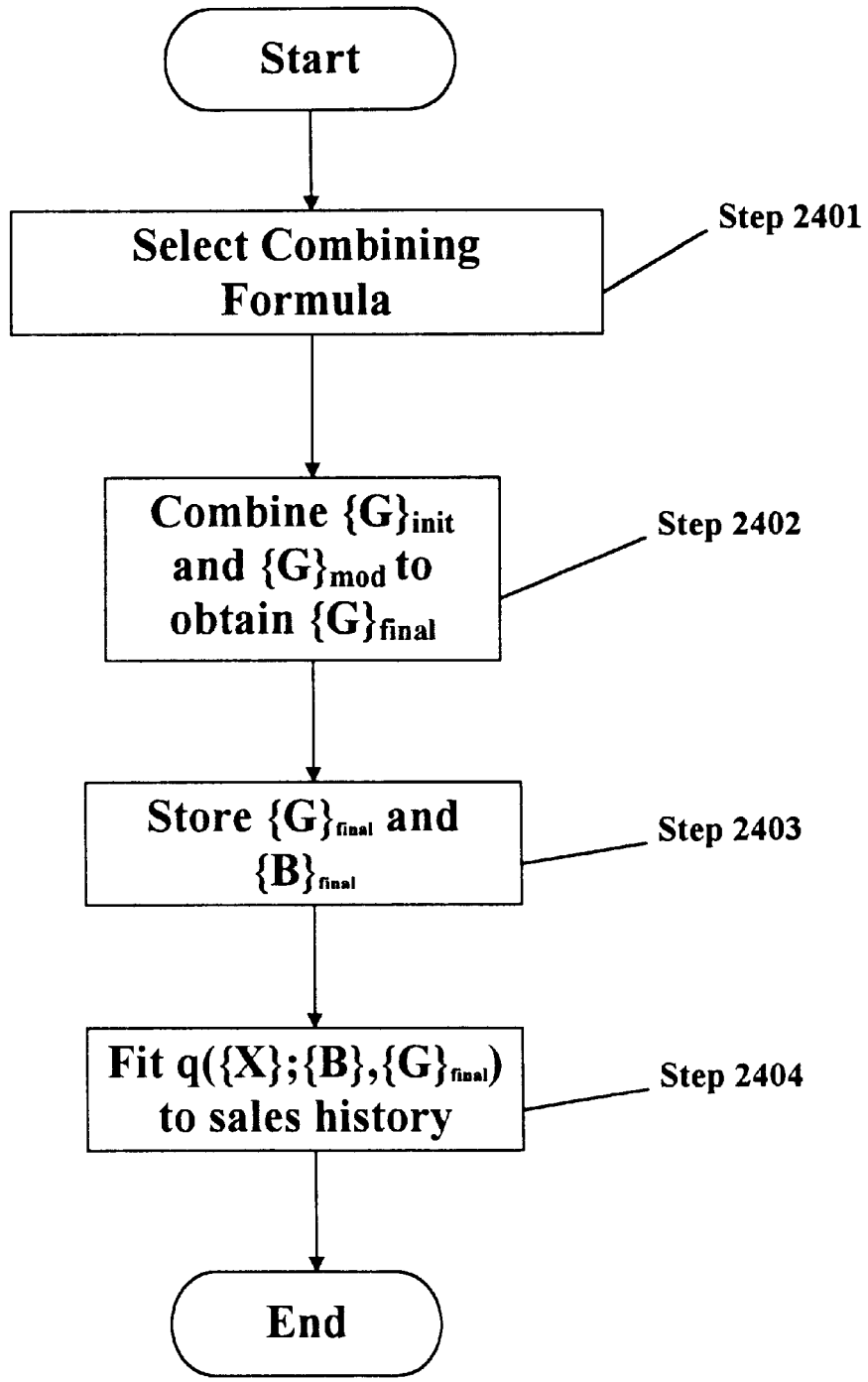
FIG. 15 is a flowchart of the Final Tuning routine of the second preferred embodiment.

A preferred embodiment of this routine will be described with reference to FIG. 14.
(Step 2301)

The fitted demand model $q(\{X\};\{B\},\{G\})$ is modified by replacing the universal parameters $\{G\}$ with the selected market model. Thus, the demand model for a particular item i takes the following form:

$$q = q(\{X\};\{B_i\},G(\{m\};\{\gamma\}))$$

This modified demand model has operational variables $\{X\}$ and market variables $\{m\}$ as independent variables, and base parameters $\{B_i\}$ and market parameters $\{\gamma\}$ as parameters.

The motivation behind making this transformation is to introduce stability to the tuning by using reducing the number of fitted parameters and by including outside market information. The universal parameters {G} for all the items become replaced with a handful of market model parameters {γ}. This is a great reduction since a typical demand forecast is performed on a whole retail category, which will typically contain over 100 items. At the same time, additional information from the market as a whole has been introduced through the market variables {m}. The advantage of this is that if the sales history that is being used to tune the model is flawed, there is a way to use outside market information to stabilize the tuning. This addresses the problem of random fluctuations in the sales history data, which could mislead a demand model into predicting that sales should rise as price is increased.
(Step 2302)

This modified demand model is fitted to the same sales history as in the Initial Tuning, with the modification that the additional market variables are included.
(Step 2303)

The fitted values of the market parameters {γ} are used in the market model to obtain a set of calculated universal parameters {G}.
(Step 2304)

The calculated universal parameters {G}, denoted as $\{G\}_{mod}$, and the χ2, denoted as $\chi 2_{mod}$, are stored in a Market Tuning table in the Table portion 216 of the memory 204.

Final Tuning

In this step, the results of the Initial Tuning routine and the Market Model Tuning routine are used to obtain a final value for the universal parameters. A preferred embodiment of this step will be described with reference to FIG. 15.
(Step 2401)

The user at this point selects a formula to combine the universal parameters from the Initial Tuning routine, $\{G\}_{init}$, and the universal parameters from the Market Model Tuning routine, $\{G\}_{mod}$, in order to obtain the final values for the universal parameters $\{G\}_{final}$. The parameters could be combined utilizing the following expression:

$$\{G\}_{final} = \frac{(1/\chi^2_{init})\{G_{init}\} + (1/\chi^2_{mod})\{G_{mod}\}}{(1/\chi^2_{init}) + (1/\chi^2_{mod})}$$

In this way, the degree to which each method fits the sales history can be used to obtain the final set of parameter values.

Alternatively, an item-specific coefficient can be utilized so that an item i whose sales history has a lot of fluctuations would give more weight to the market model determination $(G_{mod})_i$ rather than the bare demand model determination $(G_{init})_i$. If the quantity $1/\sigma_i$ is defined as a measure of the dispersion in the sales history for item i, then the universal parameter for each item could be determined as follows:

$$(G_{final})_i = \frac{(1/\chi^2_{init})(G_{init})_i \sigma_i + (1/\chi^2_{mod})(G_{mod})_i}{(1/\chi^2_{init})\sigma_i + (1/\chi^2_{mod})}$$

This technique allows the demand model for each item to be based on the most accurate data for that particular item.
(Step 2402)

The results contained from the Initial Tuning table and the Market Tuning table are recalled, and the selected formula is used to obtain the combined values of the {G}, and labeled $\{G\}_{final}$.

(Step 2403)

A final fitting to the sales history is performed, except this time the demand model q({X};{B},{G}) is modified to q({X};{B},{G}$_{final}$), so that the values for the universal parameters are fixed, and only the item-specific parameters {B} are determined and labeled as $\{B\}_{final}$.
(Step 2404)

The values $\{G\}_{final}$ and $\{B\}_{final}$ are then stored in the Final Tuning table of the Table portion 216 of the memory 204. This table contains the final demand model, tuned and optimized to yield the most accurate predictions. This table can then be stored in an external storage unit and used in another routine, for example, a forecasting system, or a price optimization system.

Having thus described two preferred embodiments of the Method for Stabilized Tuning of Demand Models, it should be apparent to those skilled in the art that certain advantages of the within method have been achieved. It should also be appreciated that numerous modifications, adaptations, and alternative embodiments thereof may be made within the scope and spirit of the present invention. For example, the illustrated embodiments present examples applicable to a retail environment; however, it should be appreciated that the present invention is also applicable in other environments where demand models are used. Further, it should be appreciated that the sales history utilized in the present invention doesn't have to represent actual sales; for instance, it can be hypothetical data obtained through customer surveys or even represent hits on an internet web page.

The above description is presently the best contemplated mode of carrying out the invention. This illustration is made for the purposes of illustrating the general principles of the invention, and is not to be taken in a limiting sense. The scope of the invention is best determined by reference to the following claims.

What is claimed is:

1. A computer-implemented method for tuning a demand model to a sales history that is stable with respect to random fluctuations in said sales history, said method comprising the steps of:

providing a data storage having sales history data;

selecting a demand model, said demand model depending on a plurality of parameters including at least one demand parameter;

selecting a market model to describe how a subset of said at least one demand parameter is expected to vary according to external market information, said market model depending on at least one market parameter, which is external to said sales history data;

constructing a an effective figure-of merit function from said demand model and said market model, said effective figure-of-merit function having a plurality of parameters including said at least one demand parameter and said at least one market parameter; and minimizing said effective figure-of-merit function with respect to said at least one demand parameter and said at lest one market parameter, thereby attaining an optimal value for said at least one demand parameter that is stable with respect to random fluctuations in said sales history data.

2. The computer-implemented method of claim 1 wherein said demand model predicts the demand for at least one item.

3. The computer-implemented method of claim 1 wherein said demand model predicts the demand for at least one service.

4. The computer-implemented method of claim 1 wherein said demand model is a function having the form:

$$q=q(\{X\};\{D\})$$

where $\{D\}$ is said at least one demand parameter and $\{X\}$ is a set of all variable for said at least one item or service.

5. The computer-implemented method of claim 1 wherein said market model is a function having the form:

$$M=M(\{g\},\{S\})$$

where $\{g\}$ is said subset of said at least one demand parameter and $\{S\}$ is said at least one market parameter.

6. The computer-implemented method of claim 1 wherein said market model is defined such that its value is minimized as said subset of said at least one demand parameter is optimized with respect to said external market information.

7. The computer-implemented method of claim 6 further comprising the step of:

constructing a figure-of-merit function from said demand model such that said figure-of-merit function attains a minimum value when said at least one demand parameter is optimized with respect to said sales history data.

8. The computer-implemented method of claim 7 wherein said step of constructing said effective figure-of-merit function further includes the step of:

combining said figure-of-merit function with said market model to form said effective figure-of-merit function.

9. The computer-implemented method of claim 1 further comprising the step of storing said optimal value for said at least one demand parameter in an external data storage, whereby said optimal value can be used in another routine.

10. A computer-readable storage medium, for use in a computer having a storage device for storing sales history data, said computer-readable storage medium for storing program code for causing the computer to perform the steps of:

selecting a demand model to predict the demand of a plurality of parameters including at least one demand parameter;

selecting a market model to describe how a subset of said at least one demand parameter is expected to vary according to external market information, said market model depending on at least one market parameter, which is external to said sales history data;

combining said demand model and said market model to from an effective figure-of-merit function; and minimizing said effective figure-of-merit function with respect to said at least one demand parameter and said at least one market parameter, thereby attaining an optimal value for said at least one demand parameter that is stable with respect to random fluctuations in said sales history data.

11. The computer-readable storage medium of claim 10 wherein said demand model is a function having the form:

$$q=q(\{X\};\{D\})$$

where $\{D\}$ is said at least one demand parameter and $\{X\}$ is a set of all variable for said plurality of items.

12. The computer-readable storage medium of claim 10 wherein said market model is a function having the form:

$$M=M(\{g\},\{S\})$$

where $\{g\}$ is said subset of said at least one demand parameter and $\{S\}$ is said at least one market parameter.

13. The computer-readable storage medium of claim 10 wherein said market model is defined such that its value approaches zero as said subset of said at least one demand parameter is optimized with respect to said external market information.

14. The computer-readable storage medium of claim 10 further comprising program code for causing the computer to perform the step of:

constructing a figure-of-merit function from said demand model such that said figure-of-merit function attains a minimum value when said at least one demand parameter is optimized with respect to said sales history data;

wherein said effective figure-of-merit function is formed by combining said figure-of-merit function with said market model.

15. The computer-readable storage medium of claim 10 further comprising program code for causing the computer to perform the step of:

storing said optimized value for said at least one demand parameter in a storage device, whereby said optimized value can be used in another routine.

16. A system for tuning a demand model to a sales history that stabilizes said demand model with respect to fluctuations in said sales history, said system for use with a storage device for storing sales history data, said system comprising:

means for selecting a demand model and a market model, said demand model depending on a plurality of parameters including at least one demand parameter;

wherein said market model describes how a subset of said at least one demand parameter is expected to vary according to external market information, said market model depending on at least one market parameter that is external to said sales history;

means for combining said demand model and said market model to form an effective figure-of-merit function; and means for optimizing said at least one demand parameter in said effective figure-of-merit function that is stable with respect to random fluctuations in said sales history data.

17. The system of claim 16 further comprising means for accessing said external market data.

18. The system of claim 16 further comprising:

means for storing said optimized value of said at least one demand parameter, whereby said optimized value can be used in another routine.

* * * * *